United States Patent
Murota et al.

(10) Patent No.: US 10,640,951 B2
(45) Date of Patent: May 5, 2020

(54) TRAVEL CONTROL SYSTEM OF CONSTRUCTION MACHINE

(71) Applicant: Caterpillar SARL, Geneva (CH)

(72) Inventors: Isao Murota, Tokyo (JP); Shota Hoshaku, Tokyo (JP); Naoto Funabiki, Tokyo (JP)

(73) Assignee: Caterpillar SARL, Geneva (CH)

( * ) Notice: Subject to any disclaimer, the term of this patent is extended or adjusted under 35 U.S.C. 154(b) by 67 days.

(21) Appl. No.: 15/741,723

(22) PCT Filed: Jun. 29, 2016

(86) PCT No.: PCT/EP2016/065089
§ 371 (c)(1),
(2) Date: Jan. 3, 2018

(87) PCT Pub. No.: WO2017/005563
PCT Pub. Date: Jan. 12, 2017

(65) Prior Publication Data
US 2018/0202127 A1    Jul. 19, 2018

(30) Foreign Application Priority Data
Jul. 3, 2015    (JP) .................................. 2015-134393

(51) Int. Cl.
*B62D 1/12* (2006.01)
*B62D 11/02* (2006.01)
(Continued)

(52) U.S. Cl.
CPC .............. *E02F 9/2004* (2013.01); *B62D 1/12* (2013.01); *B62D 1/22* (2013.01); *B62D 11/003* (2013.01); *B62D 11/02* (2013.01); *B62D 11/04* (2013.01); *E02F 3/32* (2013.01); *E02F 9/2012* (2013.01); *E02F 9/225* (2013.01); *E02F 9/2246* (2013.01); *E02F 9/2253* (2013.01);
(Continued)

(58) Field of Classification Search
CPC ........ B62D 11/02; B62D 11/003; B62D 1/12; E02F 9/225; E02F 9/2012; E02F 9/2292; E02F 9/2004; E02F 89/2253
See application file for complete search history.

(56) References Cited

U.S. PATENT DOCUMENTS

| | | |
|---|---|---|
| 8,606,463 B2 | 12/2013 | Bichler et al. |
| 2002/0157284 A1 | 10/2002 | Tamaru et al. |

(Continued)

FOREIGN PATENT DOCUMENTS

| | | |
|---|---|---|
| JP | 11-131530 A | 5/1999 |
| JP | 11131530 A | 5/1999 |

(Continued)

*Primary Examiner* — Anne Marie M Boehler

(57) ABSTRACT

To reduce load on the operator and to establish traveling stability in the steering operation of a construction machine that has a pair of right and left traveling devices, and an engine as a driving power to the right and left traveling devices, a controller is provided which is responsive to a switch for traveling to drive or stop both a right and a left traveling devices. A switch for steering causes the controller to change the direction of travel of the construction machine, and the controller also acts to reduce the engine speed in accordance with the operation amount of the switch for steering.

14 Claims, 6 Drawing Sheets

(51) Int. Cl.
*E02F 9/20* (2006.01)
*B62D 11/00* (2006.01)
*E02F 9/22* (2006.01)
*B62D 11/04* (2006.01)
*B62D 1/22* (2006.01)
*E02F 3/32* (2006.01)
*E02F 9/26* (2006.01)

(52) U.S. Cl.
CPC .......... *E02F 9/2285* (2013.01); *E02F 9/2292* (2013.01); *E02F 9/26* (2013.01)

(56) References Cited

U.S. PATENT DOCUMENTS

| | | | |
|---|---|---|---|
| 2006/0021819 A1* | 2/2006 | Shearer | E02F 9/2004 180/321 |
| 2006/0137931 A1 | 6/2006 | Berg et al. | |
| 2016/0146227 A1* | 5/2016 | Hoshaku | B62D 1/22 60/428 |
| 2018/0050724 A1* | 2/2018 | Morselli | B62D 15/025 |

FOREIGN PATENT DOCUMENTS

| | | | |
|---|---|---|---|
| JP | 2003-301805 A | 10/2003 | |
| JP | 2004-308136 * | 11/2004 | ............... E02F 9/16 |
| WO | 2014/115908 A1 | 7/2014 | |

* cited by examiner (A)

(B)

(A)

OPERATION OF SWITCH FOR STEERING (B)

OPERATION OF SWITCH FOR STEERING

TRAVEL CONTROL SYSTEM OF CONSTRUCTION MACHINE

CROSS-REFERENCE TO RELATED APPLICATIONS

This application is a national phase application of International Patent Application No. PCT/EP2016/065089 filed Jun. 29, 2016, which claims priority to Japanese Patent Application No. 2015-134393 filed Jul. 3, 2015, both of which are incorporated by reference herein in their entireties for all purposes.

TECHNICAL FIELD

The present invention relates to the technical field of travel control systems of construction machines such as hydraulic shovels.

BACKGROUND ART

There are construction machines, such as a hydraulic shovel with a crawler-type lower traveling body, which have a pair of left and right traveling devices, left and right manipulators for traveling that are operated to drive the left and right traveling devices respectively (left and right pedals for traveling and lever for traveling, in the case of a hydraulic shovel), a work device for executing a variety of work such as excavation, and a manipulator for work operated to drive the work device (a joystick operating lever provided on each of the left and right sides of the operator's seat, in the case of a hydraulic shovel).

The operator of such a construction machine needs to continuously operate the left and right manipulators for traveling while the chassis of the construction machine is traveling. For example, when a traveling operation is executed using the left and right pedals for traveling, these left and right pedals for traveling need to be constantly stepped on while the construction machine is traveling, and the longer the traveling distance, the longer the time the pedals need to be stepped on, leading to the accumulation of fatigue in the operator, partly because a construction site where the construction machine is used has rough ground.

There have conventionally been known a technique in which the operator's cab is provided with a selector switch for cruise control and the left and right traveling devices are advanced straight ahead at a constant speed by operating the selector switch (see PTL 1, for example), and a technique in which the grips of the left and right operating levers for work on the left and right sides of the operator's seat are provided with variable output switches and the left and right traveling devices are driven by operating these switches (see PTL 2, for example).

CITATION LIST

Patent Literature

[PTL 1]
Japanese Patent Application Laid-open No. H11-131530
[PTL 2]
Japanese Patent Application Laid-open No. 2003-301805

According to the configuration of PTL 1, however, operating the selector switch can only start and stop the straight travel at constant speed, and the left and right manipulators for traveling (operating levers for traveling) are operated in order to change the direction of travel. In this configuration, operating at least either one of the left and right manipulators for traveling during the constant-speed straight travel based on the operation of the selector switch discontinues the constant-speed straight travel based on the operation of the selector switch, to drive left and right traveling devices at a speed corresponding to the operation amounts of the manipulators for traveling. A problem this configuration faces is that smooth steering operation cannot be performed due to a discontinuous change in speed in shifting from the constant-speed straight traveling to steering traveling.

According to the configuration of PTL 2, on the other hand, the left and right traveling devices are driven by operating the left and right variable output switches provided on the grips of the left and right operating levers for work, raising the need to continuously operate the left and right variable output switches during travel, and there remains a problem concerning the accumulation of fatigue of the operator as a result of operating these switches for a long time. Also according to the configuration of PTL 2, the levers of the left and right variable output switches can be operated both forward and backward and the travel speed is increased or reduced depending on the operation amounts (inclination angles) of these levers; however, the levers of the variable output switches provided on the grips of the operating levers are small, and operating the levers is prone to result in large operation amounts. For this reason, this configuration faces a problem in that in a steering operation, for example, the traveling devices are caused to make a sharp turn with the speed remaining high, resulting in losing the stability of the chassis; here are the problems to be solved by the present invention.

SUMMERY

The invention described is a travel control system of a construction machine having: left and right traveling devices; an engine as a power source for the left and right traveling devices; left and right manipulators for traveling that are operated to drive the left and right traveling devices respectively; a work device for executing work other than traveling; and a manipulator for work that is operated to drive the work device, wherein the travel control system is provided with a switch for traveling that is provided separately from the left and right manipulators for traveling and operated to drive and stop both the left and right traveling devices, a manipulator for steering that is operated to change a direction of travel of the traveling devices that are being driven based on an operation of the switch for traveling, and travel control means for controlling driving of the left and right traveling devices based on operation signals output from the switch for traveling and the manipulator for steering, and the travel control means performs steering control for reducing a speed of either the left or right traveling device in accordance with an operation position and operation amount of the manipulator for steering, and engine speed control for lowering a speed of the engine in accordance with the operation amount of the manipulator for steering.

The invention described in claim 1 can not only significantly reduce the load on the operator during travel of the construction machine, but also facilitate an easy steering operation and enable smooth shifting from straight traveling to steering traveling. Moreover, as the engine speed drops in accordance with the operation amount of the manipulator for steering, stable steering traveling can be realized even when the construction machine makes a sharp turn.

The invention described in claim 2 can improve operability of the switch for traveling and the manipulator for steering.

According to the invention described in claim 3, it is not necessary to operate the switch for traveling to stop the driving of the left and right traveling devices when the operator wishes to run the left and right traveling devices by operating the left and right manipulators for traveling or to drive the work device during the driving of the left and right traveling devices performed based on the operations of the switch for traveling and the manipulator for steering. Therefore, the invention described in claim 3 can not only contribute to the improvement of work efficiency but also prevent the traveling devices from being driven by mistake as a result of erroneously operating the switch for traveling or the manipulator for steering while operating the left and right manipulators for traveling and the manipulators for work.

According to the invention described in claim 4, the lock mechanism can prohibit the driving of the left and right traveling devices and the work device that is performed based on operations of the left and right manipulators for traveling and the manipulators for work, and at the same time prohibit the driving of the traveling devices performed based on operations of the switch for traveling and the manipulator for steering.

According to the invention described in claim 5, the traveling devices can be run or stopped by operating the switch for traveling, and the switch for traveling needs to be operated twice before running the stopped traveling devices, reliably preventing the traveling devices from being run by an unintentional, erroneous operation of the switch for traveling.

The invention described in claim 6 allows the operator to understand the direction of travel of the lower traveling body, even in the standby mode prior to running the lower traveling body, let alone while running the lower traveling body. Therefore, the operator can cause the lower traveling body to travel at ease.

The invention described in claim 7 can allow the operator to certainly understand that the driving of the traveling devices is based on operations of the switch for traveling and the switch for steering.

DESCRIPTION OF EMBODIMENTS

Figure 1:
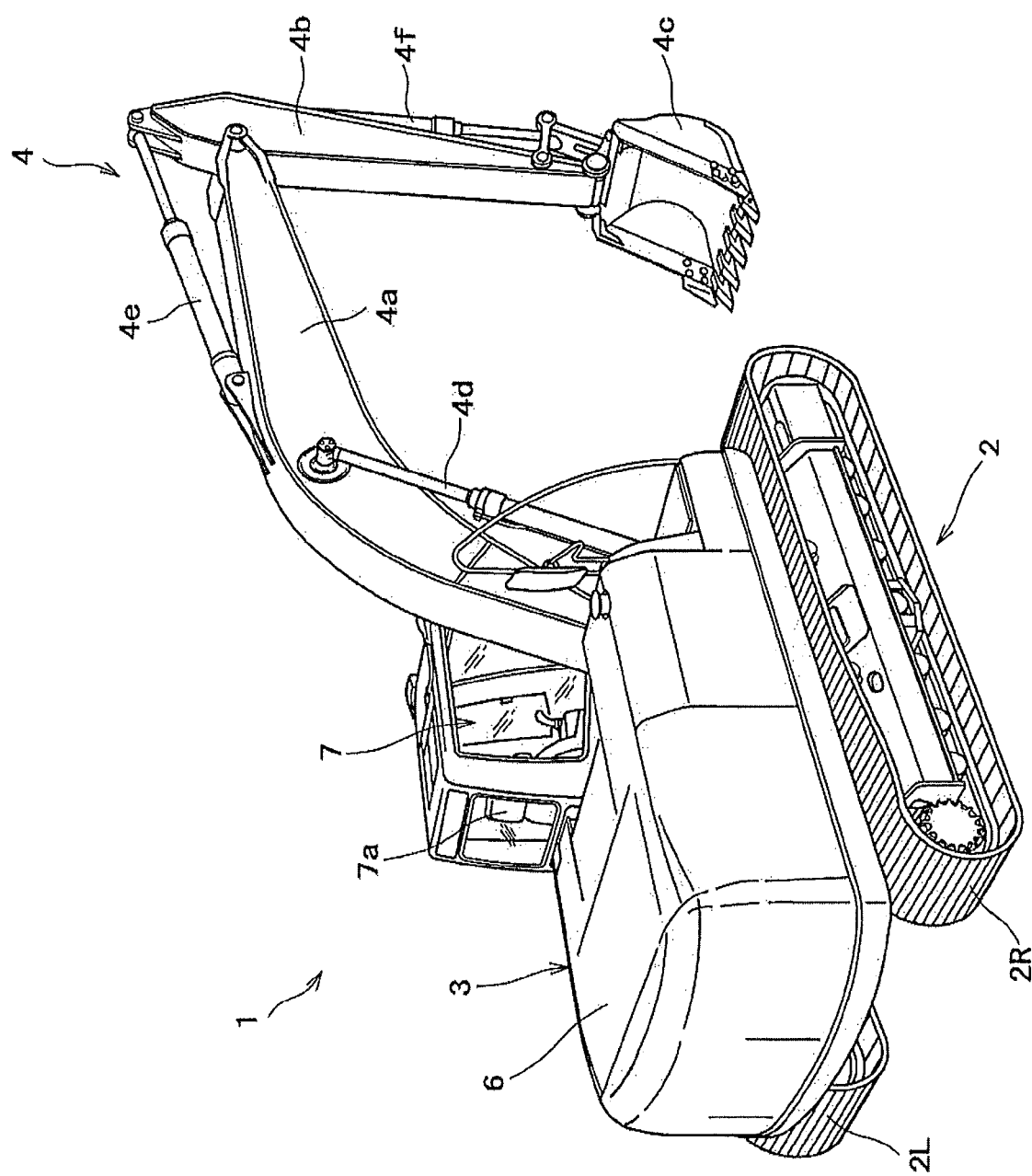
FIG. 1 is a perspective view of a hydraulic shovel.

An embodiment of the present invention is described hereinafter with reference to the drawings. In FIG. 1, reference numeral 1 represents a hydraulic shovel (the construction machine according to the present invention, an example of a shovel-type construction machine). The hydraulic shovel 1 is configured by a crawler-type lower traveling body 2, an upper rotating body 3 supported in a rotatable manner on the lower traveling body 2, a work device 4 installed on the upper rotating body 3, and the like. The work device 4 is configured using members such as a boom 4a, a stick 4b, and a bucket 4c, and has a boom cylinder 4d, a stick cylinder 4e, and a bucket cylinder 4f as hydraulic actuators for driving the boom 4a, the stick 4b, and the bucket 4c.

The lower traveling body 2 is configured by left and right traveling devices 2L, 2R that are driven independently. The left and right traveling devices 2L, 2R are driven by left and right travel motors 5L, 5R (not shown in FIG. 1), respectively.

Figure 2:
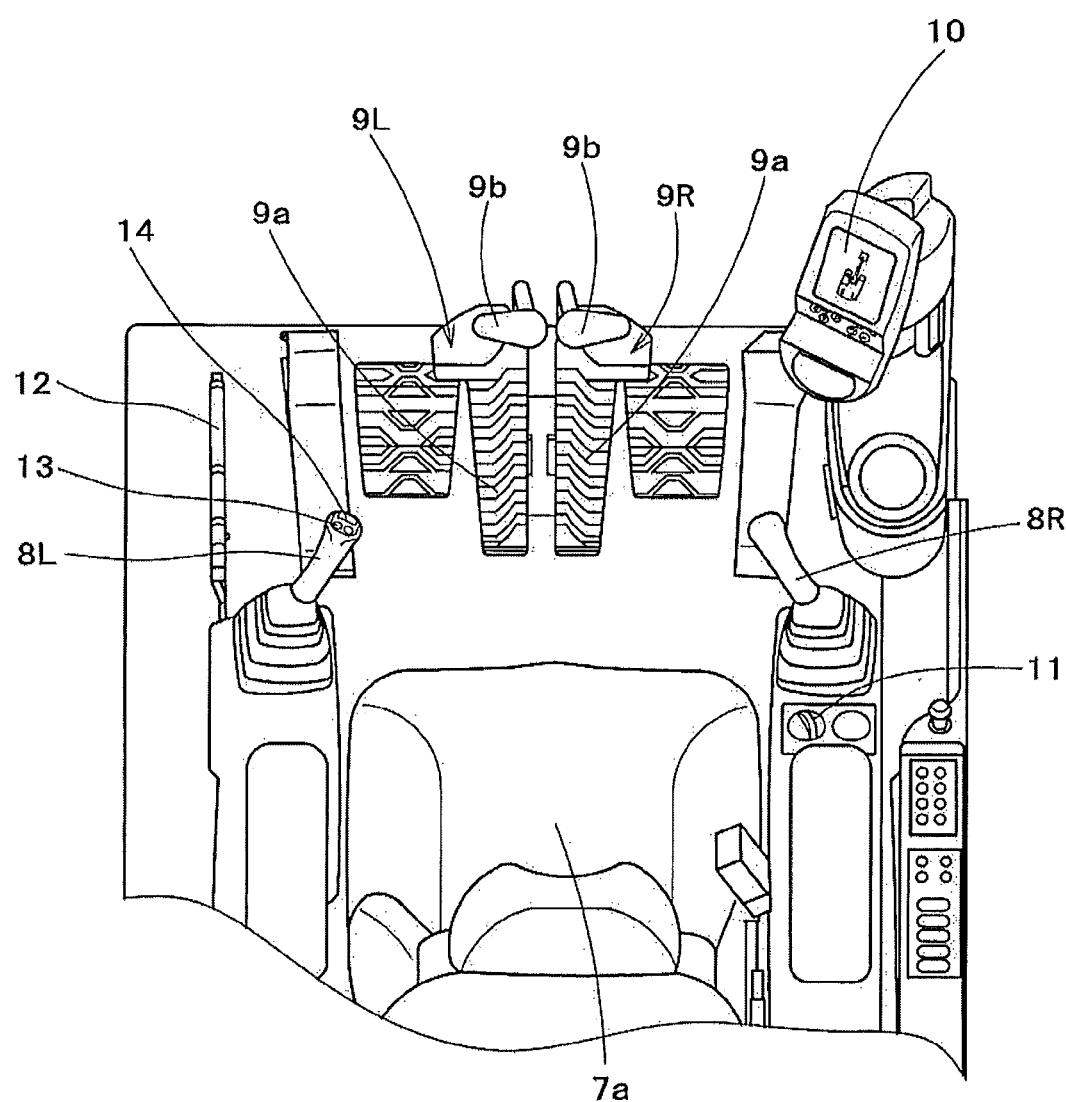
FIG. 2(A) is a plan view showing the inside of an operator's cab.
FIG. 2(B) is a diagram showing a grip portion of an operating lever for work that is provided with a switch for traveling and a switch for steering.
Figure 2:
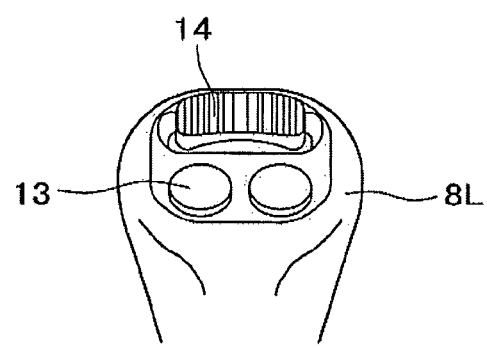

The upper rotating body 3 is equipped with an engine room 6 for storing various types of equipment such as an engine (not shown) as a power source, and an operator's cab 7 with an operator's seat 7a therein. Arranged in the inside of the operator's cab 7 are, as shown in FIG. 2, various manipulators such as left and right joystick-type operating levers for work 8L, 8R disposed on the left and right sides of the operator's seat 7a and operated to drive the work device 4 and to rotate the upper rotating body 3, left and right manipulators for traveling 9L, 9R (including pedals for traveling 9a and levers for traveling 9b on the left and right sides) disposed in front of the operator's seat 7a and operated to drive the left and right traveling devices 2L, 2R respectively, a monitor (corresponding to the display means according to the present invention) 10 for displaying various information such as chassis information and camera information, an engine speed setting tool 11 described hereinafter, and a hydraulic lock lever 12. Note that the left and right operating levers for work 8L, 8R correspond to the manipulators for work and the operating levers according to the present invention.

In addition, a switch for traveling 13 and a switch for steering (corresponding to the manipulator for steering according to the present invention) 14 are disposed in a grip portion of the operating lever for work (the left operating lever for work in the present embodiment) 8L of the left and right operating levers for work 8L, 8R. The switch for traveling 13 is an automatic return push button that is operated in order to drive and stop both the left and right traveling devices 2L, 2R. The switch for traveling 13 is operated by being pressed by a thumb or the like. An operation signal of the switch for traveling 13 is input to a controller (corresponding to the travel control means according to the present invention) 15, which is described hereinafter. The switch for steering 14 is a slidable thumbwheel switch that is operated in order to change the direction of travel of the traveling devices 2L, 2R that are being driven based on an operation of the switch for traveling 13. The switch for steering 14 is operated by being slid from its neutral position to the left or right by a thumb or the like. The operation position and operation amount (sliding distance) of the switch for steering 14 are also input to the controller 15. Note that the switch for steering 14 has returning means, not shown, for returning the switch for steering 14 to its neutral position once the operation thereof is canceled. The operations for driving and stopping the left and right traveling devices 2L, 2R based on the operations of the switch for traveling 13 and the switch for steering 14 are described hereinafter.

Figure 3:
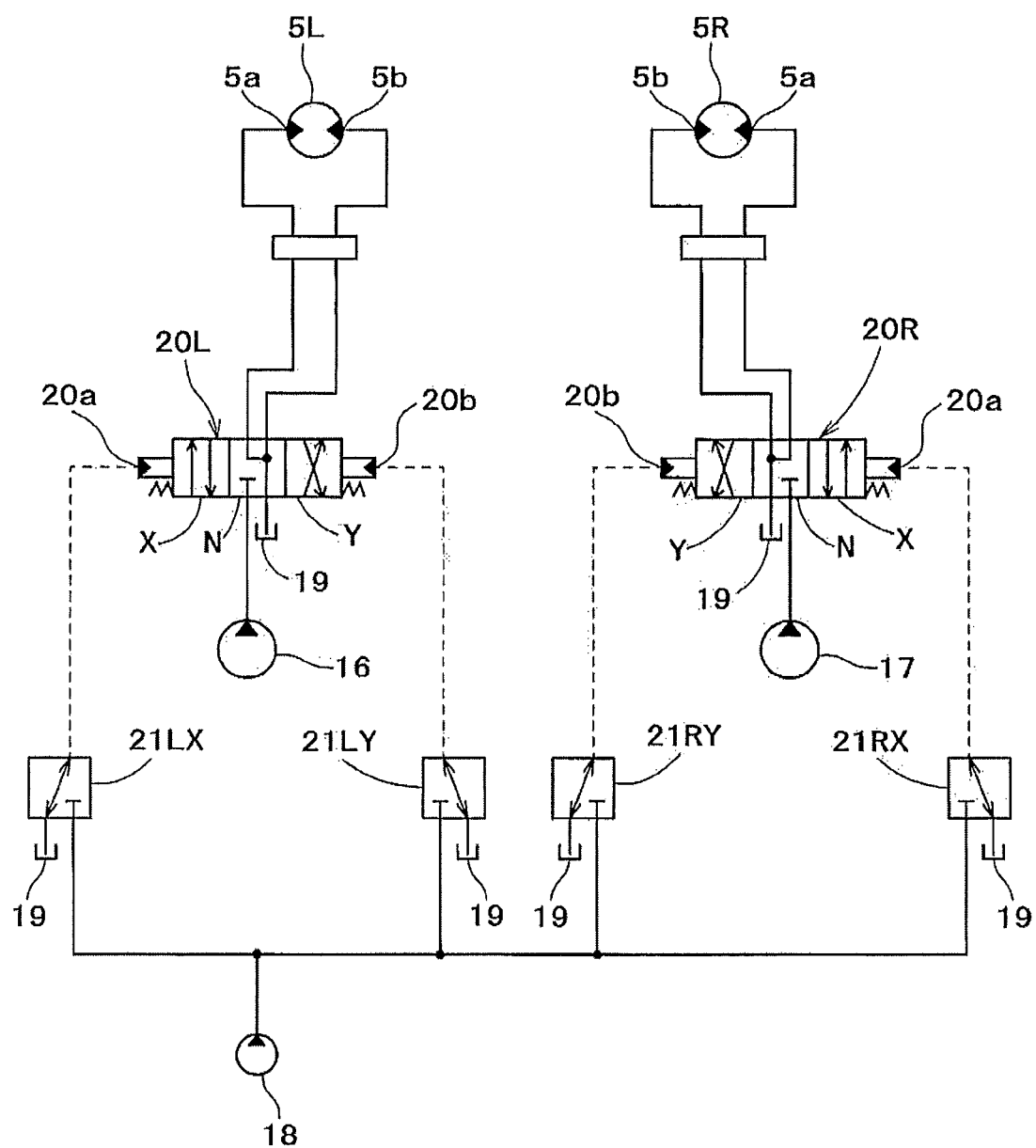
FIG. 3 is a hydraulic circuit diagram of a travel motor.

How pressure oil is supplied to the left and right travel motors 5L, 5R are described next with reference to the hydraulic circuit diagram shown in FIG. 3. In FIG. 3, reference numerals 16, 17 represent hydraulic pumps driven by the engine, 18 a pilot pump driven also by the engine, 19 an oil tank, and 20L, 20R are left and right control valves for traveling that control the supply and discharge of oil to and from the left and right travel motors 5L, 5R.

The left and right control valves for traveling 20L, 20R are identical to each other; thus, the left control valve for traveling 20L is described as an example. The left control valve for traveling 20L is a three-way selector valve with pilot ports 20a, 20b for forward movement and backward movement. In a state in which pilot pressure is input to neither one of the pilot ports 20a, 20b, the left control valve for traveling 20L is in its neutral position N where pressure oil is not supplied to the left travel motor 5L, but a pilot pressure is input to the forward movement pilot port 20a, thereby switching the position of the left control valve for traveling 20L to a forward movement actuation position X where pressure oil of the hydraulic pump 16 is supplied to a port 5a of the left travel motor 5L in order to drive the left travel motor 5L for forward movement and the oil discharged from another port 5b is let flow to the oil tank 19. On the other hand, by inputting pilot pressure to the backward movement pilot port 20b, the position of the left control valve for traveling 20L is switched to a backward movement actuation position Y where the pressure oil of the hydraulic pump 16 is supplied to the port 5b of the left travel motor 5L in order to drive the left travel motor 5L for backward movement and the oil discharged from the port 5a is let flow to the oil tank 19.

Moreover, in FIG. 3, reference numerals 21LX, 21LY, 21RX, and 21RY represent left forward movement, left backward movement, right forward movement, and right backward movement electromagnetic proportional valves. These electromagnetic proportional valves 21LX, 21LY, 21RX, 21RY are each configured to output pilot pressures to the forward movement and backward movement pilot ports 20a, 20b of the left and right control valves for traveling 20L, 20R based on a control command from the controller 15.

Thus, when the left forward movement, left backward movement, right forward movement, and right backward movement electromagnetic proportional valves 21LX, 21LY, 21RX, 21RY output pilot pressures based on the control command from the controller 15, the positions of the left and right control valves for traveling 20L, 20R are switched to the forward movement actuation position X or the backward movement actuation position Y and the left and right travel motors 5L, 5R are driven for forward movement or backward movement. According to this configuration, the pilot pressures output from the electromagnetic proportional valves 21LX, 21LY, 21RX, 21RY are increased/reduced based on the control command sent from the controller 15, and then the spool distances of the left and right control valves for traveling 20L, 20R increase/decrease in response to the increase/decrease of the pilot pressures. Consequently, the amount of pressure oil supplied increases/decreases and the driving speeds of the left and right travel motors 5L, 5R increase/decrease, i.e., the driving speeds of the left and right travel motors 5L, 5R increase/decrease in response to the increase/decrease of the pilot pressures output from the electromagnetic proportional valves 21LX, 21LY, 21RX, 21RY. Driving the left and right travel motors 5L, 5R for forward movement at a constant speed moves the lower traveling body 2 straight ahead. Slowing down the speed of the left travel motor 5L during this forward travel turns the lower traveling body 2 to the left, and slowing down the speed of the right travel motor 5R turns the lower traveling body 2 to the right. Driving the left and right travel motors 5L, 5R for backward movement at a constant speed moves the lower traveling body 2 straight backward. Slowing the speed of the left travel motor 5L during this backward movement turns the lower traveling body 2 to the left, and slowing down the speed of the right travel motor 5R turns the lower traveling body 2 to the right.

Figure 4:
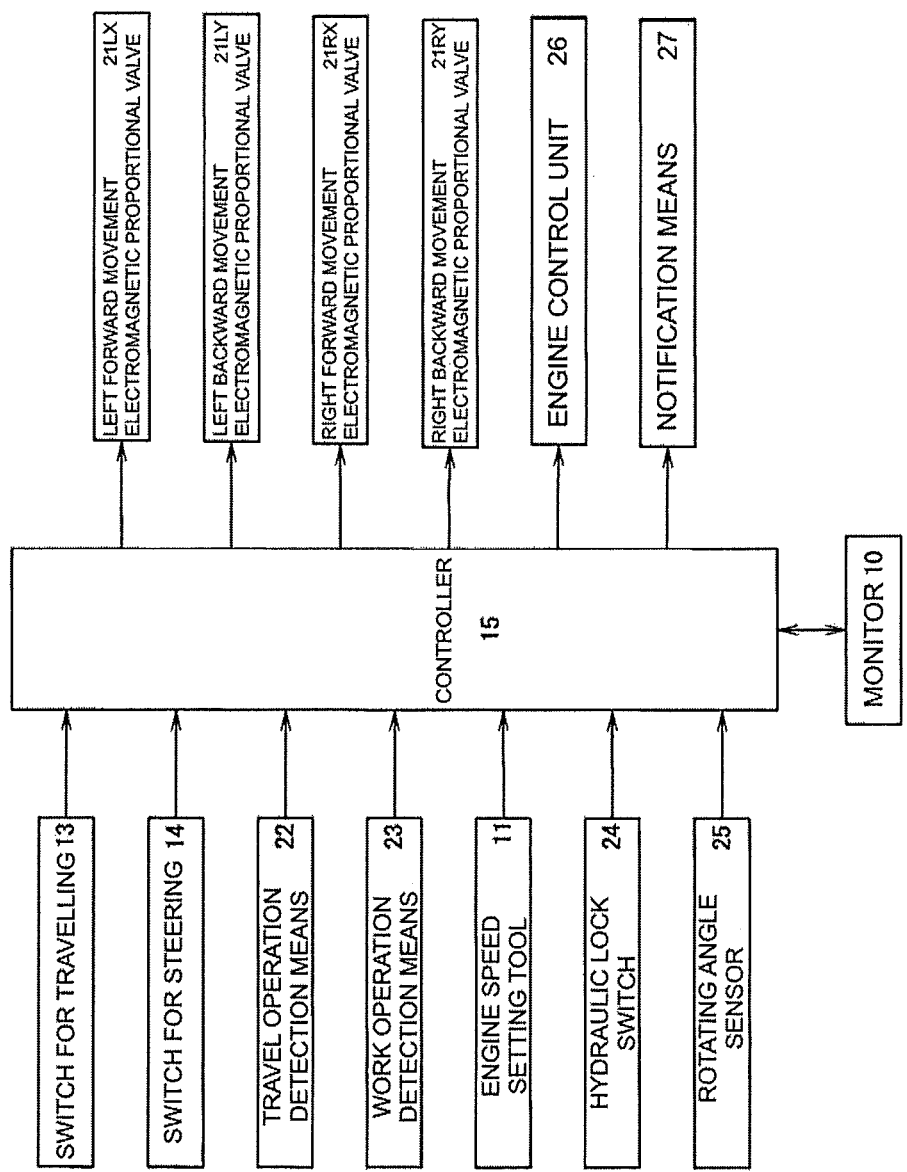
FIG. 4 is a block diagram showing the input side and the output side of a controller.

As shown in the block diagram of FIG. 4, the switch for traveling 13, the switch for steering 14, travel operation detection means 22 for detecting operations of the left and right manipulators for traveling 9L, 9R, work operation detection means 23 for detecting operations of the left and right operating levers for work 8L, 8R, the engine speed setting tool 11, a hydraulic lock switch 24 for detecting the lock position of the hydraulic lock lever 12, a rotating angle sensor 25 for detecting the rotating angle of the lower traveling body 2 with respect to the upper rotating body 3, and the like are connected to the input side of the controller 15, and the left forward movement, left backward movement, right forward movement, and right backward movement electromagnetic proportional valves 21LX, 21LY, 21RX, 21RY, an engine control unit 26 for controlling the engine speed, notification means 27 and the like are connected to the output side of the controller 15. The controller 15 is also connected to the monitor 10 such that the controller 15 and the monitor 10 can implement input and output to and from each other.

The engine speed setting tool 11 is a manipulator used by an operator to arbitrarily set a target engine speed, and is generally referred to as "throttle dial," "throttle lever," "accelerator dial," or "accelerator lever." The set value of the engine speed setting tool 11 is input to the controller 15 as a set target engine speed.

The hydraulic lock lever 12 is provided so as to be displaceable to an unlocked position and a locked position. Even when the left and right operating levers for work 8L, 8R and the left and right manipulators for traveling 9L, 9R are operated with the hydraulic lock lever 12 in the locked position, this operation is invalidated and supply of pressure oil to the hydraulic actuators (the boom cylinder 4d, the stick cylinder 4e, and the bucket cylinder 4f for driving the work device 4, and the left and right travel motors 5L, 5R for driving the left and right traveling devices 2L, 2R) for driving the work device 4 and the traveling devices 2L, 2R becomes prohibited. In other words, driving of the work device 4 and the traveling devices 2L, 2R becomes prohibited. When the hydraulic lock lever 12 is in the locked position, the hydraulic lock switch 24 outputs an ON signal to the controller 15. The hydraulic lock lever 12 and the hydraulic lock switch 24 configure the lock mechanism of the present invention.

The notification means 27 notifies the operator of "standby mode" or "travel mode" described hereinafter, by means of an alarm or the like. The notification means 27 can be provided in the monitor 10.

Figure 5:
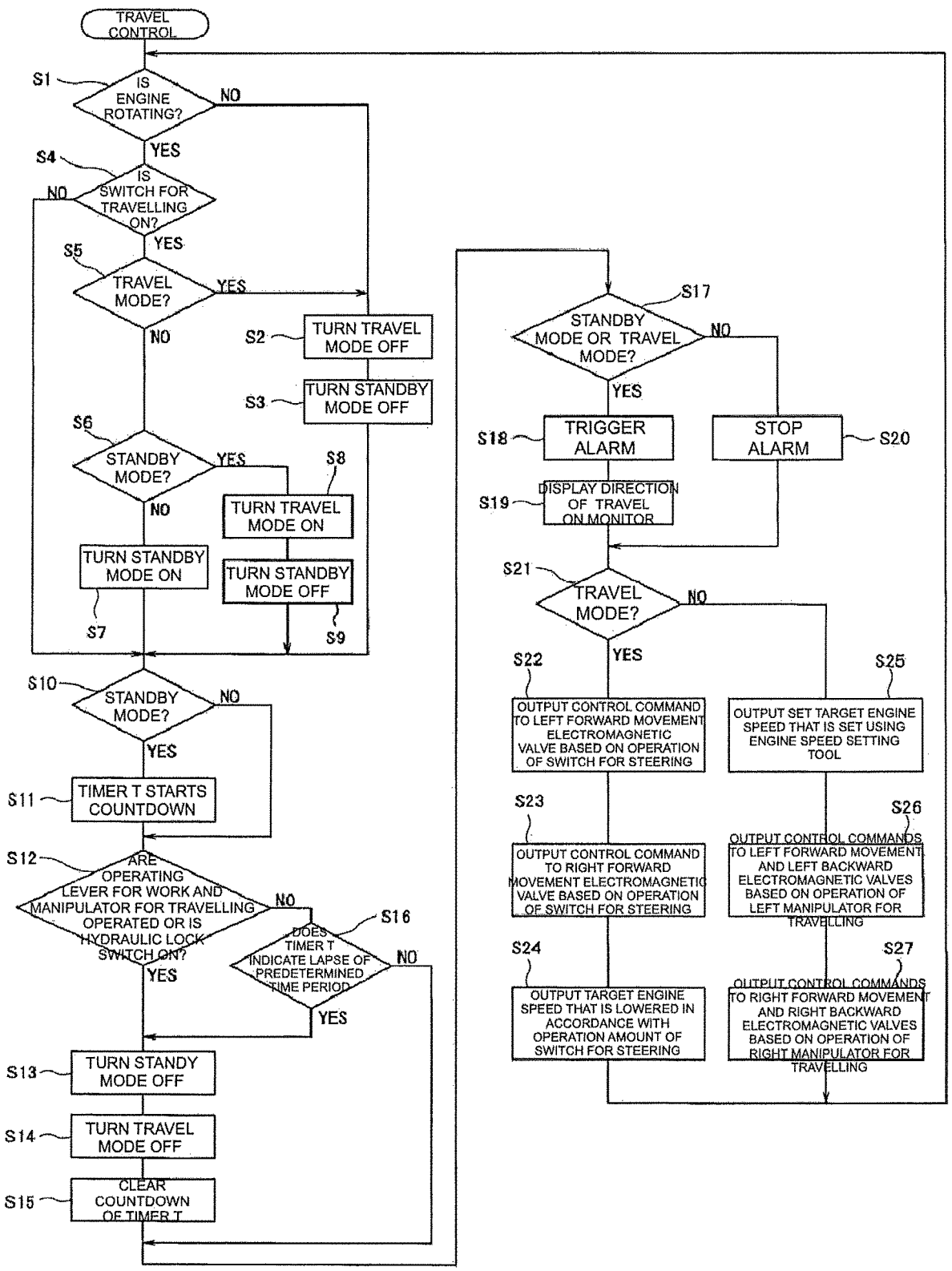
FIG. 5 is a flowchart showing a process of travel control.

Travel control performed by the controller 15 is described next with reference to the flow chart shown in FIG. 5. In the following description, "standby mode" and "travel mode" are the modes that are set (ON) or canceled (OFF) by operating the switch for traveling 13. The "standby mode" is the mode in which driving of the left and right traveling devices 2L, 2R is put on hold, and the "travel mode" is the mode in which the left and right traveling devices 2L, 2R are driven based on the operation position and operation amount of the switch for steering 14. Travel control performed during the "travel mode" is described using steps S22 to S24 below. When both the "standby mode" and the "travel mode" are OFF, normal travel control is performed in which the left and right traveling devices 2L, 2R are driven by operating the left and right manipulators for traveling 9L, 9R. This normal travel control is described using steps S25 to S27 below.

When starting travel control, the controller 15 first determines whether the engine is rotating or not (step S1). When the result of the determination in step S1 is "NO," i.e., when it is determined that the engine is stopped, the "travel mode" and the "standby mode" are turned OFF (steps S2, S3), and the process moves on to step S10. Specifically, when the engine is stopped, both the "travel mode" and the "standby mode" are OFF.

When the result of the determination in step S1 is "YES," i.e., when it is determined that the engine is rotating, the controller 15 determines whether the switch for traveling 13 is operated or not (is the switch for traveling ON?) (step S4).

When the result of the determination in step S4 is "NO," i.e., when it is determined that the switch for traveling 13 is not operated, the process moves on to step S10. When the result of the determination in step S4 is "YES," i.e., when it is determined that the switch for traveling 13 is operated, the controller 15 determines whether the travel control is in the "travel mode" or not (step S5).

When the result of the determination in step S5 is "YES," i.e., when it is determined that the travel control is in the "travel mode," the process moves on to step S2, and after the execution of the foregoing steps S2 and S3, the process moves on to step S10. Specifically, in a case where the travel control is in the "travel mode" when the switch for traveling 13 is operated, both the "travel mode" and the "standby mode" are turned OFF.

However, when the result of the determination in step S5 is "NO," i.e., when it is determined that the travel control is not in the "travel mode," the controller 15 determines whether the travel control is in the "standby mode" or not (step S6). When the result of the determination in step S6 is "NO," i.e., when it is determined that the travel control is not in the "standby mode," the "standby mode" is turned ON (step S7). Specifically, in a case where the travel mode is not in the "travel mode" or the "standby mode" when the switch for traveling 13 is operated, the mode is set to the "standby mode."

When the result of the determination in step S6 is "YES," i.e., when it is determined that the travel control is in the "standby mode," the "travel mode" is turned ON (step S8), the "standby mode" is turned OFF (step S9), and the process moves on to step S10. Specifically, in a case where the travel control is in the "standby mode" when the switch for traveling 13 is operated, the mode is set to the "travel mode."

In a case where the result of the determination in step S4 is "NO" after the execution of step S3, the process moves on to step S10 after the execution of step S7 and step S9, as described above. However, in step S10, it is determined whether the travel control is in the "standby mode" or not.

When the result of the determination in step S10 is "YES," i.e., when it is determined that the travel control is in the "standby mode," a timer T starts countdown (step S11), and whether any of the left and right operating levers for work 8L, 8R and left and right manipulators for traveling 9L, 9R is operated or not or whether the hydraulic lock switch 24 is ON or not is determined (step S12). When the result of the determination in step S10 is "NO," i.e., when it is determined that the travel control is not in the "standby mode," the process moves on to the determination of step S12 described above. In other words, the timer T counts down during the "standby mode" only.

When the result of the determination in step S12 is "YES," i.e., when any of the left and right operating levers for work 8L, 8R and left and right manipulators for traveling 9L, 9R is operated or the hydraulic lock switch 24 is turned ON (the hydraulic lock lever 12 is in the locked position), the "standby mode" and the "travel mode" are turned OFF (steps S13, S14), and the process moves on to step S17 after the countdown of the timer T is cleared (step S15). Specifically, when any of the left and right operating levers for work 8L, 8R and left and right manipulators for traveling 9L, 9R is operated or when the hydraulic lock switch 24 is ON, both the "standby mode" and the "travel mode" are turned OFF.

When the result of the determination in step S12 is "NO," i.e., when none of the left and right operating levers for work 8L, 8R and left and right manipulators for traveling 9L, 9R is operated and the hydraulic lock switch 24 is OFF, the controller 15 determines whether the time on the timer T indicates a lapse of a predetermined time period (e.g., three seconds) or not (step S16).

When the result of the determination in step S16 is "YES," i.e., when it is determined that the time on the timer T indicates a lapse of the predetermined time period, the process moves on to step S13. The process moves on to step S17 after the execution of steps S13, S14, S15. In other words, the timer T counts down during the "standby mode," and when the countdown of the timer T indicates a lapse of the predetermined time period, both the "standby mode" and the "travel mode" are turned OFF. When the result of the determination in step S16 is "NO," i.e., when it is determined that the time on the timer T does not indicate a lapse of the predetermined time period, the process moves on to step S17.

In step S17, the controller 15 determines whether the travel control is in the "standby mode" or the "travel mode." When the result of the determination in step S17 is "YES," i.e., when it is determined that the travel control is in the "standby mode" or the "travel mode," the controller 15 outputs a control command to the notification means 27 to trigger an alarm (step S18). The controller 15 also outputs a control command to the monitor 10 to display the direction of travel of the lower traveling body 2 with respect to the upper rotating body 3, based on the rotating angle input by the rotating angle sensor 25 (step S19). Therefore, in a case where the travel control is in the "standby mode" or the "travel mode," the alarm notifies the operator of the mode, and the direction of travel of the lower traveling body 2 with respect to the upper rotating body 3 is displayed on the monitor 10.

When the result of the determination in step S17 is "NO," i.e., when it is determined that the travel control is not in the "standby mode" or "travel mode," the controller 15 outputs a controller command to the notification means 27 to stop triggering an alarm (step S20).

After the execution of steps S18 and S19 or step S20, the controller 15 determines whether the travel control is in the "travel mode" or not (step S21). When the result of the determination in step S21 is "YES," i.e., when it is determined that the travel control is in the "travel mode," drive control is executed on the left and right traveling devices 2L, 2R in the "travel mode" in steps S22 to S24.

Figure 6:
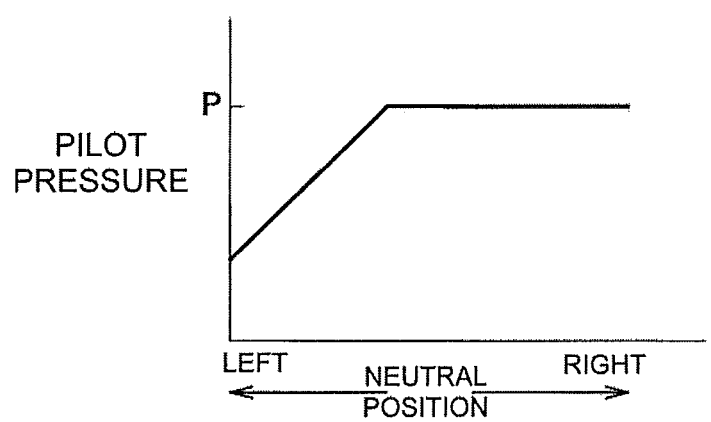
FIG. 6(A) is a diagram showing the relationship between an operation of the switch for steering and a pilot pressure output from a left forward movement electromagnetic proportional valve.
FIG. 6(B) is a diagram showing the relationship between an operation of the switch for steering and a pilot pressure output from a right forward movement electromagnetic proportional valve.
Figure 6:
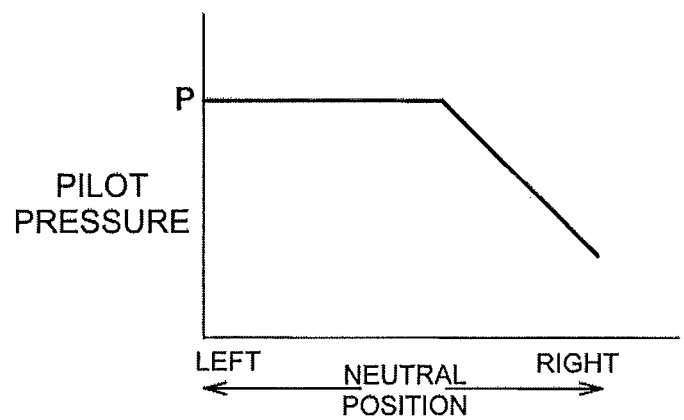

Specifically, in steps S22 and S23, the controller 15 outputs control commands to the left forward movement electromagnetic proportional valve 21LX and the right forward movement electromagnetic proportional valve 21RX to output pilot pressures. As a result, the left and right travel motors 5L, 5R are driven for forward movement, and thereby the lower traveling body 2 moves forward. In this case, based on the operation position and operation amount of the switch for steering 14, the controller 15 obtains command values to be sent to the left forward movement electromagnetic proportional valve 21LX and the right forward movement electromagnetic proportional valve 21RX. More specifically, the controller 15 has stored therein tables in which is set a relationship of the operation position and operation amount of the switch for steering 14 to the pilot pressures output from the left forward movement electromagnetic proportional valve 21LX and the right forward movement electromagnetic proportional valve 21RX, and obtains the command values to be sent to the left forward movement electromagnetic proportional valve 21LX and the right forward movement electromagnetic proportional valve 21RX by using this table. As shown in the table for the left forward movement electromagnetic proportional valve 21LX in FIG. 6(A), a predetermined level of pilot pressure P (predetermined pilot pressure P) is output when the switch for steering 14 is operated to the neutral position or to the right, and a pilot pressure lower than the predetermined pilot pressure P is output when the switch for steering 14 is operated to the left, i.e., the higher the operation amount to the left, the lower the pilot pressure becomes. On the other hand, according to the table for the right forward movement electromagnetic proportional valve 21RX shown in FIG. 6(B), the predetermined pilot pressure P is output when the switch for steering 14 is operated to the neutral position or to the left, and a pilot pressure lower than the predetermined pilot pressure P is output when the switch for steering 14 is operated to the right, i.e., the higher the operation amount to the right, the lower the pilot pressure becomes. Therefore, when the switch for steering 14 is in the neutral position, the left forward movement electromagnetic proportional valve 21LX and the right forward movement electromagnetic proportional valve 21RX equally output the predetermined pilot pressure P, driving the left and right travel motors 5L, 5R for forward movement at a constant speed and advancing the lower traveling body 2 straight ahead. However, when the switch for steering 14 is operated from the neutral position to the left, the right forward movement electromagnetic proportional valve 21RX outputs the predetermined pilot pressure P, while the left forward movement electromagnetic proportional valve 21LX outputs a pilot pressure lower than the predetermined pilot pressure P, reducing the driving speed of the left travel motor 5L to be lower than that of the right travel motor 5R and consequently turning the lower traveling body 2 to the left. In addition, operating the switch for steering 14 from the neutral position to the right causes the left forward movement electromagnetic proportional valve 21LX to output the predetermined pilot pressure P and the right forward movement electromagnetic proportional valve 21RX to output a pilot pressure lower than the predetermined pilot pressure P, reducing the driving speed of the right travel motor 5R to be lower than that of the left travel motor 5L and consequently turning the lower traveling body 2 to the right. Also, in operating the switch for steering 14 to the left or right, the greater the operation amount thereof, the lower the speeds of the left travel motor 5L and the right travel motor 5R becomes, thereby causing the lower traveling body 2 to make a sharp turn.

In step S24, the controller 15 performs engine speed control to reduce the engine speed in accordance with the operation amount of the switch for steering 14. In so doing, the controller 15 compares an engine speed limiting value, which is set such that the greater the operation amount of the switch for steering 14 from the neutral position to the left or right, the lower the engine speed becomes, with the set target engine speed that is set using the engine speed setting tool 11, and then outputs whichever smaller to the engine control unit 26 as the target engine speed. As a result, the engine speed is controlled such that the greater the operation amount of the switch for steering 14, or the greater the turning angle of the lower traveling body 2 is, the lower the engine speed becomes. The engine speed is also controlled in such a manner as to not exceed the set target engine speed set by the operator using the engine speed setting tool 11.

When the result of the determination in step S21 is "NO," i.e., when it is determined that the travel control is not in the "travel mode," the normal travel control for driving the left and right traveling devices 2L, 2R by operating the left and right manipulators for traveling 9L, 9R is executed in steps S25 to S27.

Specifically, in step S25, the set target engine speed set using the engine speed setting tool 11 is output to the engine control unit 26 as the target engine speed. Consequently, the engine speed is controlled to become the target engine speed that is set by the operator using the engine speed setting tool 11.

In steps S26 and S27, based on an operation signal input from the travel operation detection means 22, the controller 15 further outputs control commands to the left forward movement and left backward movement electromagnetic proportional valves 21LX and 21LY to output pilot pressures corresponding to the operation direction and operation amount of the left manipulator for traveling 9L when it is operated. When, on the other hand, the right manipulator for traveling 9R is operated, the controller 15 outputs control commands to the right forward movement and right backward movement electromagnetic proportional valves 21RX and 21RY to output pilot pressures corresponding to the operation direction and operation amount of the manipulator for traveling 9R. Thus, when both the left and right manipulators for traveling 9L, 9R are in the neutral positions thereof, the left forward movement, left backward movement, right forward movement, and right backward movement electromagnetic proportional valves 21LX, 21LY, 21RX, and 21RY do not output the pilot pressures and the lower traveling body 2 is stopped, but when the left and/or right manipulators for traveling 9L, 9R is operated forward and/or backward, the left and right travel motors 5L, 5R are driven for forward movement and backward movement at the speed corresponding to the operation amount of the manipulators for traveling 9L, 9R, causing the lower traveling body 2 to move straight ahead, turn left, or turn right.

Thus, when the "standby mode" and the "travel mode" are OFF; neither the left operating lever for work 8L nor the right operating lever for work 8R is operated; and the switch for traveling 13 is pressed when the hydraulic lock switch 24 is OFF, the controller 15 enters the "standby mode." When the switch for traveling 13 is pressed again within a predetermined time period since the "standby mode," the controller 15 enters the "travel mode." In the "travel mode," the control commands are output to the left forward movement electromagnetic proportional valve 21LX and the right forward movement electromagnetic proportional valve 21RX to output pilot pressures, thereby driving the left and right traveling devices 2L, 2R forward and moving the lower traveling body 2 forward. When the switch for steering 14 is in the neutral position, the lower traveling body 2 is moved straight ahead, but when the switch for steering 14 is operated to the left, the driving speed of the left traveling device 2L is reduced and the left traveling device 2L turns to the left. When the switch for steering 14 is operated to the right, the driving speed of the right traveling device 2R is reduced and the right traveling device 2R turns to the right. In this case, the greater the operation amount of the switch for steering 14 is, the more the driving speed of the left or right traveling device 2L, 2R is reduced, causing the lower traveling body 2 to make a sharp turn. The controller 15 also executes the engine speed control in which the greater the operation amount of the switch for steering 14 is, the lower the engine speed becomes. When the switch for traveling 13 is pressed during the "travel mode," the "standby mode" and the "travel mode" are turned OFF, stopping the left and right traveling devices 2L, 2R. In a case where the switch for traveling 13 is not pressed within a predetermined time period since the "standby mode" (in a case where a predetermined time period has elapsed while in the "standby mode"), the "standby mode" is canceled. Also, in a case where any of the left and right operating levers for work 8L, 8R and left and right manipulators for traveling 9L, 9R is operated, the "standby mode" and the "travel mode" are turned OFF, and driving of the left and right traveling devices 2L, 2R based on the operations of the switch for traveling 13 and the switch for steering 14 is stopped. When the hydraulic lock switch 24 is ON, the "standby mode" and the "travel mode" are turned OFF, and driving of the left and right traveling devices 2L, 2R based on the operations of the switch for traveling 13 and the switch for steering 14 is prohibited. Also when the engine is stopped, the "standby mode" and the "travel mode" are turned OFF. As a result, even when the switch for traveling 13 is operated while the engine is stopped, the controller 15 does not enter the "standby mode" or "travel mode," and when the engine is stopped during the "standby mode" or the "travel mode," the mode is canceled automatically. During the "standby mode" and the "travel mode," the operator is notified of either mode by an alarm, and the direction of travel of the lower traveling body 2 with respect to the upper rotating body 3 is displayed on the monitor 10.

In the present embodiment described above, the hydraulic shovel 1 is configured by the left and right traveling devices 2L, 2R, the engine as a power source for the left and right traveling devices 2L, 2R, the left and right manipulators for traveling 9L, 9R operated to drive the left and right traveling devices 2L, 2R, the work device 4 for executing work other than traveling, the operating levers for work 8L, 8R operated to drive the work device 4, and the like. The hydraulic shovel 1 is also provided with the switch for traveling 13 provided separately from the left and right manipulators for traveling 9L, 9R and operated to drive and stop the left and right traveling devices 2L, 2R, the switch for steering 14 operated to change the directions of travel of the traveling devices 2L, 2R being driven by operating the switch for traveling 13, and the controller (travel control means) 15 for controlling driving of the left and right traveling devices 2L, 2R based on the operation signals output from the switch for traveling 13 and the switch for steering 14, wherein the controller 15 performs steering control for reducing the speed of either the left or right traveling device 2L, 2R based on the operation position and operation amount of the switch for steering 14, and engine speed control for reducing the engine speed in accordance with the operation amount of the switch for steering 14.

Therefore, the left and right traveling devices 2L, 2R can be driven and stopped by simply operating the switch for traveling 13 without continuously operating the left and right manipulators for traveling 9L, 9R, significantly reducing the load on the operator. According to this configuration, when the operator wishes to change the direction of travel of the traveling devices 2L, 2R being driven by operating the switch for traveling 13, operating the switch for steering 14 reduces the speed of either the left or right traveling devices 2L, 2R based on the operation position and operation amount of the switch for steering 14, facilitating easy steering operation and enabling smooth shifting from straight traveling to steering traveling. In addition, according to this configuration, the engine functioning as the power for the left and right traveling devices 2L, 2R is controlled to lower its speed in accordance with the operation amount of the switch for steering 14. Therefore, when the operation amount of the switch for steering 14 is high, i.e., when the lower traveling body 2 is caused to make a sharp turn, the engine speed is automatically lowered, leading to a decrease in the driving speeds of the left and right traveling devices 2L, 2R, and therefore enabling stable steering traveling even with the sharp turn.

Moreover, the configuration in which the switch for traveling 13 and the switch for steering 14 are disposed in the grip portion of the operating lever for work 8L positioned to the left side of the operator's seat 7a, allows the operator seated in the operator's seat 7a to perform operations easily, contributing to the improvement of operability.

Due to the configuration of stopping the left and right traveling devices 2L, 2R that are being driven by operating the switch for traveling 13 and the switch for steering 14 when the left and right manipulators for traveling 9L, 9R or operating levers for work 8L, 8R are operated, when the operator wishes to run the left and right traveling devices 2L, 2R by operating the left and right manipulators for traveling 9L, 9R or to drive the work device 4 while the left and right traveling devices 2L, 2R are being driven by operating the switch for traveling 13 and the switch for steering 14, the operator does not need to operate the switch for traveling 13 to stop the left and right traveling devices 2L, 2R being driven, contributing to the improvement of the work efficiency. Even when the switch for traveling 13 and the switch for steering 14 are operated in error while the left and right manipulators for traveling 9L, 9R and operating levers for work 8L, 8R are operated, the traveling devices 2L, 2R can be prevented from being driven due to such error.

The hydraulic shovel 1 has the lock mechanism (the hydraulic lock lever 12, the hydraulic lock switch 24) that prohibits driving of the left and right traveling devices 2L, 2R and the work device 4 that is performed based on the operations of the left and right manipulators for traveling 9L, 9R and the operating levers for work 8L, 8R, wherein when the lock mechanism prohibits driving of the traveling devices 2L, 2R and the work device 4, driving of the left and right traveling devices 2L, 2R based on the operations of the switch for traveling 13 and the switch for steering 14 is also prohibited. According to this configuration, the lock mechanism can disable the operations of the left and right manipulators for traveling 9L, 9R, the operating levers for work 8L, 8R, the switch for traveling 13, and the switch for steering 14 simultaneously. Moreover, even in a case where the left or right manipulator for traveling 9L, 9R, the operating lever for work 8L, 8R, the switch for traveling 13, or the switch for steering 14 is unexpectedly operated while, for example, the operator is absent from the operator's seat 7a, the lock mechanism can reliably prevent a problem where such operation drives the traveling devices 2L, 2R and the work device 4.

In addition, because the controller 15 is configured to: enter the standby mode to put driving of the left and right traveling devices 2L, 2R on hold when the switch for traveling 13 is operated while the left and right traveling devices 2L, 2R are stopped; enter the travel mode to drive the left and right traveling devices 2L, 2R in accordance with the operation position and operation amount of the switch for steering 14 when the switch for traveling 13 is operated during the standby mode; and stop the left and right traveling devices 2L, 2R when the switch for traveling 13 is operated during the travel mode, the traveling devices 2L, 2R can be run or stopped based on an operation of the switch for traveling 13. Moreover, since the switch for traveling 13 needs to be operated twice in order to run the stopped traveling devices 2L, 2R, the traveling devices 2L, 2R can reliably be prevented from being run by an unintentional, erroneous operation of the switch for traveling 13.

The hydraulic shovel 1 is a shovel construction machine having the upper rotating body 3 supported in a rotatable manner on the lower traveling body 2, wherein the upper rotating body 3 is capable of rotating 360 degrees with respect to the lower traveling body 2, and the operator's cab 7 of the hydraulic shovel 1 is provided with the monitor 10 for displaying the direction of travel of the lower traveling body 2 with respect to the upper rotating body 3 during the standby mode and the travel mode. Such a configuration allows the operator to understand the direction of travel of the lower traveling body 2, even in the standby mode prior to running the lower traveling body 2, let alone while running the traveling body 2.

In addition, because the hydraulic shovel 1 is provided with the notification means 27 for notifying the standby mode or the travel mode, the operator can certainly understand that the lower traveling body 2 is caused to travel based on operations of the switch for traveling 13 and the switch for steering 14.

Needless to say, the present invention is not limited to hydraulic shovels and can be implemented on various construction machines having left and right traveling devices.

INDUSTRIAL APPLICABILITY

The present invention can be utilized in travel control of various construction machines such as hydraulic shovels that have left and right traveling devices.

The invention claimed is:

1. A travel control system for a construction machine, the construction machine including
    a left traveling device and a right traveling device;
    an engine operatively coupled to the left traveling device and the right traveling device for transfer of traveling power to the left traveling device and the right traveling device;
    left and right manipulators for traveling that are configured to direct traveling power to the left traveling device and the right traveling device, respectively;
    a work device for executing work other than traveling; and
    a manipulator for work that is operated to drive the work device, the travel control system comprising:
    a switch for traveling that is provided separately from the left and right manipulators for traveling and configured to output a signal irrespective of a position of the left and right manipulators for traveling to drive and stop both the left traveling device and the right traveling device,
    a manipulator for steering that is configured to output a signal to change a direction of travel of the construction machine, the manipulator for steering being configured for manipulation in a left direction and a right direction, the manipulator for steering being biased toward a neutral position disposed between the left direction and the right direction; and
    a controller operatively coupled to the switch for traveling and the manipulator for steering, the controller being configured to
        activate a travel mode in response to an input from the switch for traveling,
        reduce a rotational speed of the left traveling device and reduce a rotational speed of the engine in response to the manipulator for steering being moved toward the left direction and in response to the activation of the travel mode,
        reduce a rotational speed of the right traveling device and reduce the rotational speed of the engine in response to the manipulator for steering being moved toward the right direction and in response to the activation of the travel mode, and
        reduce the rotational speed of the engine by a speed magnitude that is proportional to a distance of movement of the manipulator for steering away from the neutral position, during the travel mode.

2. The travel control system according to claim 1, wherein the manipulator for work includes an operating lever disposed on a left side or a right side of a seat for an operator, and
    the switch for traveling and the manipulator for steering are disposed in a grip portion of the operating lever.

3. The travel control system according to claim 1, wherein the controller is further configured to
    receive traveling input signals from the left and right manipulators for traveling,
    receive working input signals from the manipulator for work, and
    deactivate the travel mode in response to the traveling input signals or the working input signals, thereby disabling control of the left traveling device and the right traveling device in response to manipulation of the manipulator for steering.

4. The travel control system according to claim 1, further comprising a lock mechanism that prohibits driving of the left traveling device, the right traveling device, and the work device.

5. The travel control system according to claim 1, wherein the controller is further configured to activate a standby mode, in which the driving of the left traveling device and the right traveling device is put on hold, when the switch for traveling is operated while the left traveling device and the right traveling device are stopped.

6. The travel control system according to claim 5, further comprising notification means, wherein the controller is further configured to
    notify an operator, via the notification means, when the standby mode is activated, and
    activate the travel mode when the switch for traveling is operated within a predetermined time period after activation of the standby mode.

7. The travel control system according to claim 1, wherein the controller is further configured to operate each of the left traveling device and the right traveling device at a predetermined rotational speed in response to the manipulator for steering being located in the neutral position, and the activation of the travel mode.

8. The travel control system according to claim 1, wherein the controller is further configured to operate the left traveling device at a first reduced rotational speed and operate the right traveling device at a predetermined rotational speed in response to the manipulator for steering being moved toward the left direction, the first reduced rotational speed being less than the predetermined rotational speed.

9. The travel control system according to claim 8, wherein the controller is further configured to reduce the rotational speed of the left traveling device in proportion to a distance of movement of the manipulator for steering along the left direction, and maintain operation of the right traveling device at the predetermined rotational speed in response to the manipulator for steering being manipulated along the left direction.

10. The travel control system according to claim 8, wherein the controller is further configured to operate the right traveling device at a second reduced rotational speed and operate the right traveling device at the predetermined rotational speed in response to the manipulator for steering being moved toward the right direction, the second reduced rotational speed being less than the predetermined rotational speed.

11. The travel control system according to claim 10, wherein the controller is further configured to reduce the rotational speed of the left traveling device in proportion to a distance of movement of the manipulator for steering along the left direction, and maintain operation of the right traveling device at the predetermined rotational speed in response to the manipulator for steering being manipulated along the left direction.

12. The travel control system according to claim 11, wherein the controller is further configured to reduce the rotational speed of the right traveling device in proportion to a distance of movement of the manipulator for steering along the right direction, and maintain operation of the left traveling device at the predetermined rotational speed in response to the manipulator for steering being manipulated along the right direction.

13. A construction machine, comprising:
a left traveling device and a right traveling device;
an engine operatively coupled to the left traveling device and the right traveling device for transfer of traveling power to the left traveling device and the right traveling device;
left and right manipulators for traveling that are configured to direct traveling power to the left traveling device and the right traveling device, respectively;
a work device for executing work other than traveling;
a manipulator for work that is operated to drive the work device;
a switch for traveling that is provided separately from the left and right manipulators for traveling and configured to output a signal irrespective of a position of the left and right manipulators for traveling to drive and stop both the left traveling device and the right traveling device;
a manipulator for steering that is configured to output a signal to change a direction of travel of the construction machine, the manipulator for steering being configured for manipulation in a left direction and a right direction, the manipulator for steering being biased toward a neutral position disposed between the left direction and the right direction; and
a controller operatively coupled to the switch for traveling, the manipulator for steering, the engine, the left traveling device, and the right traveling device, the controller being configured to
activate a travel mode in response to an input from the switch for traveling,
reduce a rotational speed of the left traveling device and reduce a rotational speed of the engine in response to the manipulator for steering being moved toward the left direction and in response to the activation of the travel mode,
reduce a rotational speed of the right traveling device and reduce the rotational speed of the engine in response to the manipulator for steering being moved toward the right direction and in response to the activation of the travel mode, and
reduce the rotational speed of the engine by a speed magnitude that is proportional to a distance of movement of the manipulator for steering away from the neutral position, during the travel mode.

14. The construction machine according to claim 13, wherein the work device includes a shovel, and in which an upper rotating body is supported in a rotatable manner on a lower traveling body and which is provided with display means for displaying a direction of travel of the lower traveling body with respect to the upper rotating body.

* * * * *